United States Patent Office 3,000,854
Patented Sept. 19, 1961

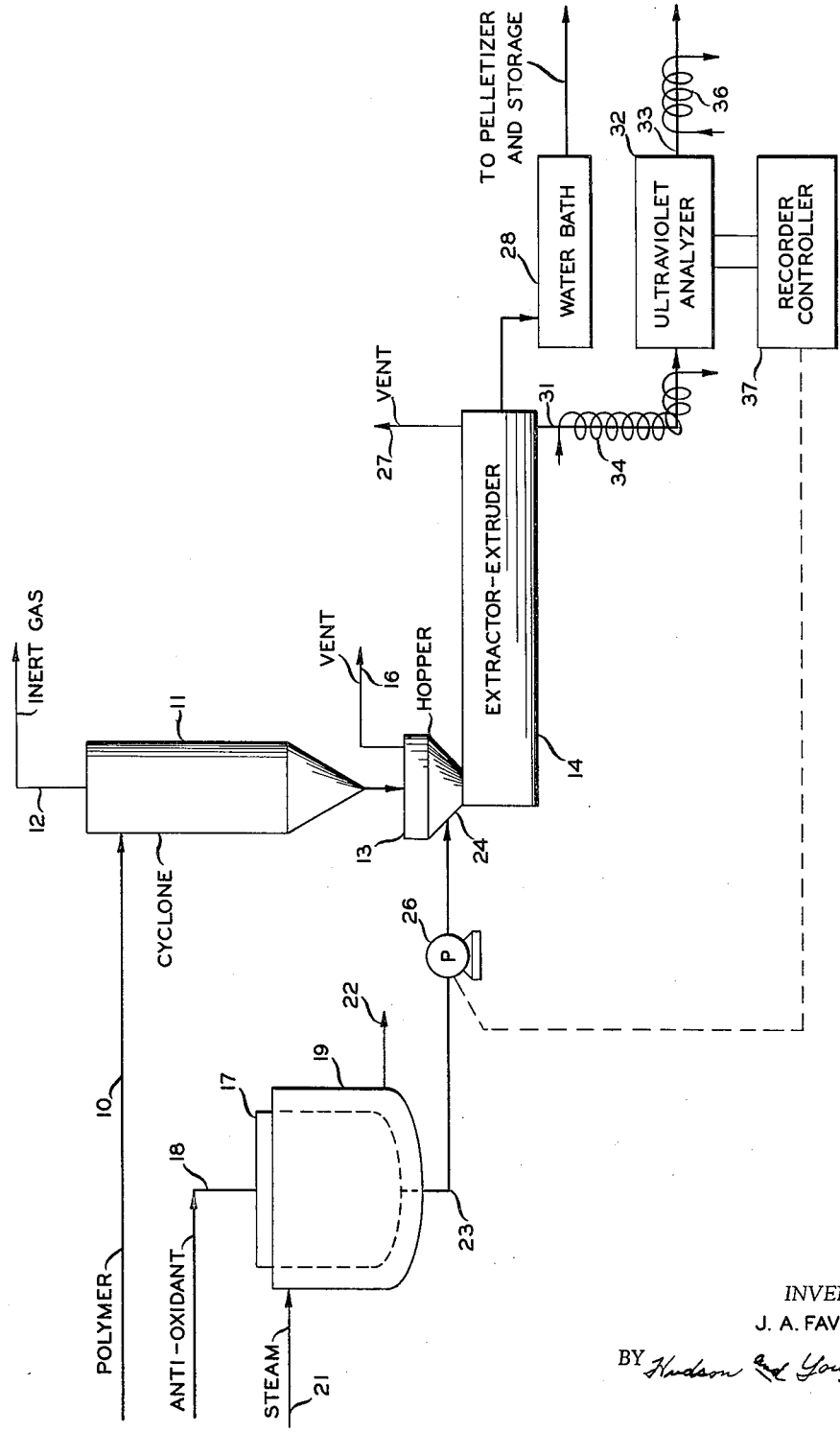

3,000,854
STABILIZATION OF POLYMERS
John A. Favre, Bartlesville, Okla., assignor to Phillips Petroleum Company, a corporation of Delaware
Filed Feb. 20, 1957, Ser. No. 641,400
8 Claims. (Cl. 260—45.95)

This invention relates to the stabilization of normally solid polymers. In one aspect, it relates to a method for controlling the rate of addition of an antioxidation agent to a normally solid polymer. In another aspect, it relates to a system for controlling the rate of addition of an antioxidation agent to a normally solid polymer.

Recently, considerable attention has been directed to the production of solid polymers, e.g., polymers of ethylene and/or propylene, employing a chromium oxide containing catalyst as described in the copending U.S. patent application of J. P. Hogan and R. L. Banks, Serial No. 573,877, filed March 26, 1956, now United States Patent 2,825,721 (1958). The solid polymers and copolymers so produced have utility in applications where solid plastics are used. For example, they can be extruded to form filaments and film, or they can be molded to form articles of any desired shape, such as bottles, containers, pipe, and the like. The normally solid polymers produced by the Hogan and Banks process are effected to a greater or lesser extent by the action of oxygen when exposed thereto in the presence of light and/or heat. One of the solutions most commonly employed to prevent or inhibit such oxidation has been the incorporation of various antioxidants into the polymer. Generally, only small amounts of the stabilizer, e.g., 0.03 weight percent, are necessary to obtain the desired antioxidative effect. In the past, some difficulty has sometimes been experienced in controlling the addition of the stabilizer so as to obtain a product of uniform composition, particularly when the polymer is produced in a continuous process. By proceeding in accordance with the instant invention, it is possible to obtain a polymer product containing a uniform amount of an antioxidation agent.

It is an object of this invention to provide a method for stabilizing normally solid polymers.

Another object of the invention is to provide a method for controlling the rate of addition of an antioxidation agent to a normally solid polymer.

Still another object of the invention is to provide a method for obtaining a polymer product containing a uniform amount of antioxidation agent.

A further object of the invention is to provide a system for controlling the rate of addition of an antioxidation agent to a normally solid polymer.

Other and further objects and advantages of the invention will become apparent to those skilled in the art upon consideration of the accompanying disclosure.

In accordance with the present invention, control over the rate of addition of the antioxidant to a normally solid polymer is effected automatically in a continuous manner through the novel utilization of an ultraviolet analyzer. I have discovered that certain antioxidation agents, namely, certain alkyl substituted phenols, have the property of absorbing electromagnetic radiation of wave lengths which are characteristic of these particular materials. Thus, these materials have been found to absorb radiation in the general region of approximately 245 to 350 millimicrons, this region being in the ultraviolet region. In a broad aspect, the method of this invention comprises measuring the absorbance of ultraviolet radiation by a polymer stream containing the antioxidant and controlling the rate of addition of the antioxidant to the polymer so as to obtain a predetermined absorbance measurement. In a more specific embodiment, the method of this invention comprises measuring the absorbance of ultraviolet radiation in the 275 to 285 millimicron region, preferably at about 280 millimicrons, of a polymer stream containing an alkyl substituted phenol, such as 2,6-ditertiarybutyl-4-methylphenol, and controlling the rate of addition of the antioxidant so as to obtain a predetermined absorbance measurement.

The present invention is broadly applicable to controlling the rate of addition of stabilizers, such as alkyl substituted phenols, to normally solid polymers. However, the invention is especially applicable to the stabilization of polymers prepared as described in the above-mentioned U.S. patent of J. P. Hogan and R. L. Banks. As set forth in this patent in more detail, unique polymers and copolymers can be produced by contacting one or more olefins with a catalyst comprising, as an essential ingredient, chromium oxide, preferably including a substantial amount of hexavalent chromium. The chromium oxide is ordinarily associated with at least one other oxide, particularly at least one oxide selected from the group consisting of silica, alumina, zirconia, and thoria. One satisfactory method for producing the catalyst comprises the use of a steam-aged commercial cracking catalyst comprising a coprecipitated gel containing approximately 90 weight percent silica and 10 weight percent alumina. Such a gel is impregnated with an aqueous solution of a chromium compound ignitable to chromium oxide. Examples of such compounds are chromium trioxide, chromium nitrate, chromium acetate, and ammonium chromate. The composite resulting from the impregnation step is dried and then contacted for a period of several hours at a temperature of from about 450 to 1500° F., preferably from about 900 to about 1000° F., for example, with a stream of a substantially anhydrous oxygen-containing gas, such as air. The olefin feed used for the polymerization is at least one olefin selected from the class of 1-olefins having a maximum chain length of 8 carbon atoms and no branching nearer the double bond than the 4-position. Examples of such olefins are ethylene, propylene, 1-butene, 1-pentene, and 1,3-butadiene. Copolymers, such as ethylene-propylene copolymers and ethylene-butadiene copolymers, can be prepared by the described method. The polymerization can be effected at a temperature in the range of 150 to 450° F. The pressure can range from approximately atmospheric to as high as 1000 p.s.i.

A satisfactory method of conducting the polymerization comprises contacting an olefin with a slurry of catalyst in a hydrocarbon solvent which can exist as a liquid at the temperature of polymerization. In such a case, the reaction pressure need only be sufficient to maintain the solvent substantially in the liquid phase and will ordinarily range from about 100 to about 700 p.s.i. When a solvent is so used, the reaction effluent comprises a mixture of solvent and polymer and contains finely divided suspended catalyst. Any suitable separation method, e.g., filtration, can be employed to effect the removal of the catalyst from the polymer solution. The polymer can be recovered from the polymer solution by any suitable means, e.g., by a series of evaporation steps as described in more detail in the copending U.S. patent application of Martin R. Cines, Serial No. 496,515, filed March 24, 1955. The polymer can also be recovered from the polymer solution by the utilization of cooling and filtration equipment whereby the dissolved polymer is precipitated from solution by cooling the solvent to a temperature below the lower cloud point and subsequently filtering.

Suitable solvents for use in the above-described process are hydrocarbons which are liquid and chemically inert under the reaction conditions. Solvents which can be advantageously used include paraffins, such as those having from 3 to 12, preferably from 7 to 9, carbon atoms per molecule, for example 2,2,4-trimethylpentane (isooctane), normal hexane, normal decane, isopentane, and the like. Another class of solvents which can be used are naphthenic hydrocarbons having from 5 to 6 carbon atoms in a naphthenic ring and which can be maintained in the liquid phase under the polymerization conditions. Examples of such naphthenic hydrocarbons are cyclohexane, cyclopentane, methylcyclopentane, methylcyclohexane, ethylcyclohexane, the methyl ethyl cyclopentanes, the methyl propyl cyclohexanes, and the ethyl propyl cyclohexanes. The described class of naphthenic hydrocarbons includes condensed ring compounds such as decalin and the alkyl derivates thereof. A preferred subclass of naphthenic hydrocarbons within the above-defined general class is constituted by those naphthenic hydrocarbons having from 5 to 6 carbon atoms in a single ring and from 0 to 2 methyl groups as the only constituents on the ring. Thus, the preferred naphthenic hydrocarbon solvents are cyclopentane, cyclohexane, methylcyclopentane, methylcyclohexane, the dimethylcyclopentanes, and the dimethylcyclohexanes.

The polymers produced by the above-described process to which the instant invention is especially applicable have an inherent viscosity of at least 0.8, preferably an inherent viscosity between about 1.2 and 10. The inherent viscosity is determined for a solution of 0.2 gram of polymer in 50 cc. of tetralin at 130° C. The molecular weight of the polymer can be conveniently calculated by multiplying the viscosity determination by 24,450. [See Kemp and Peters, "Ind. Eng. Chem." 35, 1108 (1943), and Dienes and Klemm, "Journal of Applied Physics," 17, 458–471 (1946).] The polymers in addition to having the aforementioned inherent viscosity preferably have a density of at least 0.94 at 20° C. and a crystallinity of at least 80 percent at the same temperature. More desirably, the density at 20° C. is at least 0.95, and the crystallinity at 20° C. is at least 90 percent. The crystallinity of the polymer can be determined according to the method of Matthews, Peiser and Richards, Acta Crystallographica 2, 85 (1949).

The antioxidation agents to which the invention is applicable are selected from the class consisting of alkyl substituted phenols. These substituted phenols contain alkyl substituents in the 2-, 4-, and 6-positions and can be represented by the structural formula

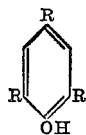

wherein R is an alkyl group containing from 1 to 8 carbon atoms and the total number of carbon atoms in the R groups are not more than 16. It is generally preferred that at least two R groups be tertiary alkyl groups. Examples of these alkyl substituted phenols include 2,4,5-trimethylphenol; 2,6-diethyl-4-methylphenol; 2,4-dimethyl-6-tertiarybutylphenol; 2,4-dimethyl-6-tertiaryoctylphenol; 2,6-ditertiarybutyl-4-methylphenol; 2,6-ditertiaryamyl-4-hexylphenol; 2,4,6-tritertiarybutylphenol; 2,6-ditertiaryamyl-4-methylphenol, and the like.

A more complete understanding of the invention may be obtained by referring to the drawing which is a flow diagram illustrating a preferred embodiment of the invention. While the invention will be discussed with relation to the addition of 2,6-ditertiarybutyl-4-methylphenol to polyethylene prepared by the aforementioned Hogan and Banks process, it is to be understood that it is not intended to limit the invention to this particular embodiment. Accordingly, the invention is broadly applicable to controlling the rate of addition of stabilizers, such as alkyl substituted phenols, to normally solid polymers in general.

As described hereinbefore, after separation of catalyst from the polymer solution in the Hogan and Banks process, the polymer solution is then treated by any suitable method to separate the polymer from the polymer solution. The separated polymer is then passed through driers wherein the polymer is subjected to a heat in order to remove volatile materials. The partially dried polymer upon leaving the drier is conveyed through conduit 10, as shown in the drawing, by an inert gas, such as nitrogen to cyclone 11. In the cyclone, the polymer is separated from the inert gas which is taken overhead through line 12. The polymer, which collects in the bottom of cyclone 11, is then passed into feed hopper 13 of extractor-extruder 14. The feed hopper has an attached vent line 16 which provides means for removing volatile material from the hopper.

Tank 17 is provided for the storage of the antioxidant which is introduced into the tank through line 18. Tank 17 is encompassed by a jacket 19 having a heating fluid inlet line 21 and an outlet line 22 connected thereto. As a result of providing a heat fluid such as steam to the space between tank 17 and jacket 19, the antioxidant in tank 17 is maintained in a molten state. Line 23, connected to the lower portion of tank 17, provides means for removing antioxidant from tank 17 and passing same to throat 24 of extractor-extruder 14. Line 23 has positioned therein a metering pump 26 which pumps the antioxidant from tank 17 through line 23 to throat 24 of the extractor-extruder.

The antioxidation agent can be incorporated in the polymer in any desired amount depending upon the conditions under which the polymer is to be used. Larger amounts of stabilizer can be used when the article to be protected is exposed to severe light or heat in the presence of oxygen. The amount of stabilizer used is generally in the range of 0.01 to 5 or higher weight percent, preferably less than 0.1 weight percent, based on the weight of the polymer. The metering pump operates so as to supply a desired amount of the antioxidant to the extractor-extruder in a manner to be described more in detail hereinafter.

The polymer and antioxidant enter extractor-extruder 14 through throat 24. In the extractor-extruder, the polymer is melted and worked so as to reduce its volatile content, e.g., to approximately 0.05 weight percent. The extractor-extruder has a vent line 27 attached thereto through which these volatile materials are removed from the apparatus. During the working of the polymer in the extractor-extruder, the antioxidant is also thoroughly mixed with the polymer so as to form a homogeneous composition. While any suitable extractor-extruder can be used in practice of the instant invention, a particularly suitable apparatus which can be employed is described in detail in Reissue Patent 23,948, reissued February 15, 1955, to L. J. Fuller. The polymer containing the antioxidant is extruded from the extractor-extruder as a plurality of strands, e.g., ⅛ inch cylindrical strands, approximately 40 in number, and arranged horizontally in a fan-shaped die. On leaving the extractor-extruder, the strands are in a liquid state, being at a temperature above the melting point of the polymer, e.g., at a temperature between about 350 and 400° F. The hot strands pass from the extractor-extruder into a water bath 28 wherein they are cooled, e.g., to a temperature of about 200° F. Thereafter, the strands are passed through an air blast to a rotary drum pelletizer, not shown. In this latter unit, the strands are cut into cylindrical pellets of the same length as the strand diameter. Pellets discharged from the pelletizer are passed through the screens for sizing and then into a pneumatic conveyor system which transports them to storage tanks.

A polymer stream containing antioxidant is removed from extractor-extruder 14 through line 31 and passed to the inlet of the sample cell associated with ultraviolet analyzer 32. Line 33 is connected to the outlet of the sample cell and in conjunction with line 31 provides means for continuously circulating the polymer stream through the cell. Lines 31 and 33 are provided with heating means such as coils 34 and 36 through which a heating fluid is continuously circulated. It is also within the scope of the invention to employ electrical heating elements in order to maintain the polymer flowing through lines 31 and 33 in a liquid state. The sample cell associated with ultraviolet analyzer 32 is also provided with a heating means in order to ensure that the polymer remains in a liquid state and is thereby capable of being circulated through the cell.

Any suitable, commercially available ultraviolet analyzer can be employed in the practice of the instant invention. One type of analysis system which can be employed consists of means for passing a first beam of ultraviolet radiation through a sample of the material under test and for passing a second beam of radiation through a standard or reference material. The intensity of the two resulting beams are compared, any differences in such intensities being an indication of the particular material under analysis. This comparison is normally made by an electrical circuit associated with suitable radiation detectors. Another type of analyzer which can be advantageously used utilizes only a sample cell in conjunction with means for chopping the radiation beam passing through the cell and impinging upon a detector unit, thereby providing a pulsating signal. The magnitude of this signal is inversely proportional to the concentration of the antioxidant contained in the polymer stream. In both of the above-described types of analyzers, a source of radiation in the ultraviolet spectrum, such as a hydrogen discharge lamp, is employed, the beam from this radiation source being passed through a monochromator prior to passage through the sample cell. As is well known in the art, the monochromator is adapted to pass radiation within a desired wave length band. An ultraviolet analyzer which can be advantageously employed in the practice of the instant invention is also described in the copending U.S. application, Serial No. 401,358, filed by H. M. Barton, Jr. on December 30, 1953, now issued as U.S. Patent No. 2,792,501. Another type of ultraviolet analyzer which can be adapted for use in the instant invention is shown in U.S. Patent No. 2,764,692, issued to E. C. Miller on September 25, 1956. This analyzer employs a rotatable disk constructed in two sections, one transparent to the radiation passed by a monochromator and the other having radiation absorption characteristics approximating those of the material under analysis. In the practice of the instant invention, the first mentioned sector can be formed of quartz while the other sector can be made of a material having ultraviolet transmission characteristics approximating those of the alkyl substituted phenol used as the stabilizer, e.g., an 0.5 mm. thick section of Corning Glass No. 7740 or a 3 mm. thick section of Corning Glass No. 9700, both manufactured by Corning Glass Works, Corning, New York.

The ultraviolet analyzer provides an output signal which is a function of the composition of the sample stream removed from extractor-extruder 14 through line 31. I have discovered that alkyl substituted phenols, such as 2,6-ditertiarybutyl-4-methylphenol, absorb radiation in the general region of approximately 245 to 310 millimicrons, this region being in the ultraviolet region. In the case of 2,6-ditertiarybutyl-4-methylphenol, the radiation absorbance has been found to be at a maximum in the region of 275 to 285 millimicrons, particularly at approximately 280 millimicrons. Accordingly, when this latter material is used as the antioxidant, the ultraviolet analyzer is sensitized so that ultraviolet radiation of approximately 280 millimicrons is passed through the sample cell. The output signal from analyzer 32, which is proportional to the amount of antioxidant contained in the polymer stream, is applied to a recorder-controller 37, which is operatively connected to metering pump 26. The rate of supply of antioxidant to the extractor-extruder is thereby maintained at a value sufficient to keep the concentration of antioxidant in the sample stream removed through line 31 at a predetermined value. In this manner, the rate at which antioxidant is added to the polymer is controlled so as to provide a polymer having a desired uniform composition.

The recorder-controller employed in the practice of the instant invention can be a commercially available item of manufacture and can provide, as desired, an air, electrical, or hydraulic signal to control the operation of the metering pump. An instrument which can be suitably employed is the potentiometer recorder-controller shown in Foxboro Bulletin 450 of the Foxboro Company, Foxboro, Massachusetts. While it is preferred to employ a metering pump as described, it is within the scope of the invention to use a centrifugal pump and a flow control means, such as a motor valve, the latter being operatively connected to recorder-controller 36. Furthermore, while the invention has been described in conjunction with an extractor-extruder, it is not intended that the invention should be limited to this particular type of apparatus. Accordingly, the antioxidant can be added to a vessel in which the polymer is maintained in a liquid state rather than to an extractor-extruder as described herein. In such a case, the sample stream would be withdrawn from the heated vessel and then passed through the sample cell of the ultraviolet analyzer.

A more complete understanding of the invention can be obtained by referring to the following illustrative example, which is not intended, however, to be unduly limitative of the invention.

EXAMPLE

A control system similar to that shown in the drawing is employed to control the rate of addition of the antioxidant, 2,6-ditertiarybutyl-4-methylphenol to polymer produced by the above-described Hogan and Banks process. The polymer so produced has the exemplary properties set out in the table hereinbelow:

*Table*

| | |
|---|---:|
| Softening Temperature, °F. [1] | 260 |
| Density | 0.96 |
| Injection molded: | |
|     Tensile strength, p.s.i. [2] | 5,100 |
|     Elongation, percent [3] | 28 |
| Compression molded: | |
|     Tensile strength, p.s.i. [2] | 4,200 |
|     Elongation, percent [3] | 20 |
| Stiffness, p.s.i. [4] | 140,000 |
| Melt Index [5] | 0.6 |
| Impact strength, Izod. [6] (ft. lbs./in notch) | 3.0 |
| Heat distortion, °F. [7] | 165 |
| Crystallinity, per cent | above 92 |

[1] Adapted from method of Karrer, Davis and Dietrich, Ind. & Eng. Chem. (Anal. Ed.) 2, 96 (1930).
[2] ASTM D 638–52T.
[3] ASTM D 412–51T.
[4] ASTM D 747–50.
[5] ASTM D 1238–52T.
[6] ASTM D 256–54T.
[7] ASTM D 648–45T.

Partially dried polymer in powdered form is conveyed by means of nitrogen from driers to the cyclone positioned above the extractor-extruder feed hopper. In the cyclone, the polymer is separated from the nitrogen and falls into the feed hopper. The antioxidant is pumped into the throat of the extractor-extruder at a rate such that the final polymer product contains 0.03 weight percent antioxidant, based on the polymer. The polymer and the anti-oxidant pass from the feed hopper into the extruder screws of the extractor-extruder. In the extractor-extruder, the polymer is melted and worked until the volatile content is reduced to approximately 0.05 weight percent. Also, the antioxidant is thoroughly mixed with the polymer so as to form a homogeneous composition. The polymer containing antioxidant is extruded from the extractor-extruder in ⅛ inch cylindrical strands. The hot strands at a temperature between 350 and 400° F. on leaving the extractor-extruder dip into a water bath wherein they are cooled to about 200° F. The strands then pass through an air blast and thence to a rotary drum pelletizer which cuts the strands into cylindrical pellets of the same length as their strand diameter. The pellets discharged from the pelletizer are passed through screens for sizing and then into a pneumatic conveyor system which transports them to run tanks.

A polymer stream is removed from the extractor-extruder through the steam jacketed conduit and continuously passed through the heated sample cell of the ultraviolet analyzer. The aforementioned conduit and cell are maintained at a temperature of about 290° F. in order to ensure that the polymer remains in liquid form. The ultraviolet analyzer is given a setting corresponding to a composition containing 0.03 weight percent of the antioxidant. The signal produced by the analyzer, which is proportional to the amount of antioxidant contained in the sample polymer stream, is applied to the recorder-controller which in turn regulates the metering pump in the outlet line from the antioxidant supply tank. When the output signal from the analyzer corresponds to an antioxidant content below 0.03 weight percent of polymer, the recorder-controller regulates the metering pump so as to increase the rate of supply of antioxidant to the extractor-extruder. Conversely, when the output signal from the analyzer corresponds to an antioxidant content above 0.03 weight percent, the signal from the recorder-controller operates the metering pump so as to cut back on the supply of antioxidant to the extractor-extruder. In this manner, the amount of antioxidant added to the polymer is controlled so that the polymer has a uniform antioxidant content of 0.03 weight percent.

From the foregoing, it is seen that a method is provided whereby it is possible to accurately control the amount of antioxidant which it is desired to add to a normally solid polymer. It will be apparent to those skilled in the art that variations and modifications of the invention can be made from a study of the foregoing disclosure. Such variations and modifications are believed to be clearly within the spirit and scope of the invention.

I claim:

1. In a process wherein an alkyl-substituted phenolic antioxidant is added to a normally solid polymer of an olefin, the improvement which comprises subjecting a sample of the resulting mixture to ultraviolet absorption analysis while said sample is maintained in the liquid state, thus determining the concentration of said antioxidant in said polymer, producing a control output which is proportional to said concentration, and varying the rate of addition of said antioxidant to said polymer in proportion to said control output, and thus maintaining said concentration substantially constant.

2. A process for controlling the rate of addition of an antioxidant to a stream of normally solid olefin polymer, which stream can vary in magnitude, which process comprises adding an alkyl substituted phenol to said normally solid polymer; passing said polymer and said phenol into a mixing and heating zone wherein said polymer and phenol are melted and thoroughly mixed; recovering polymer containing said phenol from said mixing and heating zone; withdrawing a sample of said polymer stream containing said phenol from said mixing and heating zone; maintaining said sample in the liquid state; passing a beam of ultraviolet radiation through said sample stream; measuring the absorbance of ultraviolet radiation by said sample stream; and varying the rate of addition of said phenol to said polymer in accordance with said measurement.

3. The process of claim 2 wherein said alkyl substituted phenol is 2,6-ditertiarybutyl-4-methylphenol and said ultraviolet radiation has a wave length of approximately 280 millimicrons.

4. A process for controlling the rate of addition of an antioxidant to a normally solid polyethylene, which process comprises adding an alkyl substituted phenolic antioxidant to said polyethylene, passing the resulting mixture into a mixing and heating zone wherein said mixture is melted and thoroughly mixed; recovering a resulting homogenized mixture of polyethylene and antioxidant, said mixture having an increased resistance to oxidation; withdrawing a sample of said homogenized mixture; maintaining said sample in the molten state; passing a beam of ultraviolet radiation through said sample in the molten state; measuring the absorbance of ultraviolet radiation in the 245 to 350 millimicron range by said sample; and controlling the rate of addition of said antioxidant to said polyethylene in proportion to said absorbance, thus to maintain a substantially constant concentration of said antioxidant in said polyethylene.

5. A process according to claim 4 wherein said antioxidant is 2,6-ditertiarybutyl-4-methylphenol and said ultraviolet radiation has a wave length of approximately 280 millimicrons.

6. A system for controlling the rate of addition of an antioxidant to a normally solid polymer, said system comprising, in combination, means for heating and mixing said antioxidant and said polymer; feed inlet means connected to said heating and mixing means; antioxidant inlet means connected to said feed inlet means; product outlet means connected to said heating and mixing means; sample outlet means connected to said heating and mixing means; a source of ultraviolet radiation; means for measuring the absorbance of ultraviolet radiation from said source by material flowing through said sample outlet means; means for maintaining the polymer sample in the liquid state while said sample is in said sample outlet means and in said means for measuring absorbance; and means for varying the rate of flow of antioxidant through said antioxidant inlet means in accordance with said absorbance measurement.

7. A system for controlling the rate of addition of an antioxidant to a normally solid polymer comprising, in combination, an extractor-extruder; a feed inlet attached to one end of said extractor-extruder; a product outlet attached to the other end of said extractor-extruder; an antioxidant inlet line connected to said feed inlet; a sample withdrawal line connected to said other end of said extractor-extruder; an ultraviolet analyzer connected to said sample withdrawal line; a controller operatively connected to said ultraviolet analyzer; heating means for maintaining the sample fluid in said sample withdrawal line and in said analyzer; and a flow control means positioned in said antioxidant inlet line, said flow control means being operatively connected to said controller.

8. In combination with a mixer adapted to mix solid thermoplastic polymer and phenolic antioxidant, said mixer having a polymer inlet, an antioxidant inlet, and an outlet for polymer-antioxidant mixture, the improvement which comprises: a sample analysis cell; a sample conduit establishing communication between an outlet portion of said mixer and said sample analysis cell; an ultraviolet analyzer adapted to determine the ultraviolet absorbance of a sample of the polymer-antioxidant mixture in the 245 to 350 millimicron range in said sample analysis cell; a recorder-controller, adapted to produce a control output which is proportional to said ultraviolet absorbance, and operatively connected to said ultraviolet analyzer; a metering pump in said antioxidant inlet, said metering pump being controlled by said recorder-controller to maintain a constant concentration of antioxidant in polymer; and means for heating the contents of said sample conduit and said sample cell to maintain the polymer sample therein in a molten condition.

(References on following page)

References Cited in the file of this patent

UNITED STATES PATENTS

| | | |
|---|---|---|
| 2,350,001 | Van Den Akker | May 30, 1944 |
| 2,471,887 | Nelson | May 31, 1949 |
| 2,534,352 | Herzog | Dec. 19, 1950 |
| 2,617,940 | Giguere | Nov. 11, 1952 |
| 2,824,968 | Sparks | Feb. 25, 1958 |
| 2,852,488 | Clark et al. | Sept. 16, 1958 |
| 2,883,343 | Favre et al. | Apr. 21, 1959 |

OTHER REFERENCES

O'Connor: "Jour. Am. Oil Chemists Soc.," vol. 32, No. 11, November 1955, p. 616–624.